(12) United States Patent
Tanaka et al.

(10) Patent No.: US 11,753,035 B2
(45) Date of Patent: Sep. 12, 2023

(54) VEHICLE CONTROL SYSTEM

(71) Applicant: Toyota Jidosha Kabushiki Kaisha, Toyota (JP)

(72) Inventors: Shin Tanaka, Numazu (JP); Takayuki Iwamoto, Shizuoka-ken (JP); Kazuyuki Fujita, Gotemba (JP); Masahiro Harada, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 17/096,156

(22) Filed: Nov. 12, 2020

(65) Prior Publication Data
US 2021/0146958 A1    May 20, 2021

(30) Foreign Application Priority Data
Nov. 15, 2019  (JP) .................. 2019-206826

(51) Int. Cl.
 *B60W 60/00*  (2020.01)
 *B60W 30/18*  (2012.01)
 *B60W 30/095*  (2012.01)

(52) U.S. Cl.
 CPC .... *B60W 60/0016* (2020.02); *B60W 30/0956* (2013.01); *B60W 30/18159* (2020.02);
 (Continued)

(58) Field of Classification Search
 CPC ......... B60W 60/0016; B60W 30/0956; B60W 30/18159; B60W 60/0027;
 (Continued)

(56) References Cited

U.S. PATENT DOCUMENTS 9,105,190 B2    8/2015 Akiyama
9,393,960 B2    7/2016 Kodaira
(Continued)

FOREIGN PATENT DOCUMENTS

JP    2006-001369 A    1/2006
JP    2014098965 A     5/2014
(Continued)

*Primary Examiner* — Adam R Mott
*Assistant Examiner* — Erick T. Detweiler
(74) *Attorney, Agent, or Firm* — Dinsmore & Shohl LLP

(57) ABSTRACT

The vehicle control system includes a first controller configured to generate a target trajectory for the automated driving, and a second controller configured to execute vehicle travel control such that the vehicle follows the target trajectory. During the automated driving, the second controller controls a travel control amount which is a control amount of the vehicle travel control, acquire driving environment information, and execute preventive safety control for intervening in the travel control amount based on the driving environment information. The first controller includes a memory device in which information of an intervention suppression area is stored. When the vehicle travels in the intervention suppression area during the automated driving, the first controller outputs a suppression instruction for the preventive safety control to the second controller. And the second controller suppresses intervention of the travel control amount by the preventive safety control when the suppression instruction is received.

4 Claims, 13 Drawing Sheets

(52) U.S. Cl.
CPC . *B60W 60/0027* (2020.02); *B60W 2554/4029* (2020.02); *B60W 2554/4041* (2020.02)

(58) Field of Classification Search
CPC . B60W 2554/4029; B60W 2554/4041; B60W 60/001; B60W 30/08; B60W 60/0011; B60W 60/00; B60W 60/0015; B60W 60/0017; B60W 60/0018; B60W 60/00182; B60W 60/00184; B60W 60/00186; B60W 60/0024; B60W 60/0025; B60W 60/00253; B60W 60/00256; B60W 60/00272; B60W 60/00274; B60W 60/00276; B60W 60/005; B60W 60/0051; B60W 60/0053; B60W 60/0054; B60W 60/0055; B60W 60/007

See application file for complete search history.

(56) References Cited

U.S. PATENT DOCUMENTS

| | | | |
|---|---|---|---|
| 9,405,727 | B2 | 8/2016 | Nagata |
| 9,483,945 | B2 | 11/2016 | Okita et al. |
| 9,669,760 | B2 | 6/2017 | Hanita et al. |
| 9,873,412 | B2 | 1/2018 | Moriizumi |
| 9,898,929 | B2 | 2/2018 | Harada et al. |
| 9,965,955 | B2 | 5/2018 | Fujishiro |
| 10,793,147 | B2 | 10/2020 | Kaminade et al. |
| 10,946,830 | B2 | 3/2021 | Sawai et al. |
| 11,175,673 | B2 | 11/2021 | Eshima |
| 2005/0280520 | A1 | 12/2005 | Kubo |
| 2015/0153735 | A1* | 6/2015 | Clarke ................. B62D 15/025 701/301 |
| 2017/0217395 | A1 | 8/2017 | Baba |
| 2018/0162409 | A1* | 6/2018 | Altmannshofer .... G06V 20/584 |
| 2018/0284785 | A1* | 10/2018 | Berntorp ................. G06N 3/08 |
| 2019/0039626 | A1 | 2/2019 | Hatano |
| 2019/0286147 | A1* | 9/2019 | Matsunaga ....... B60W 60/0015 |
| 2020/0167575 | A1* | 5/2020 | Nayak .................... G06N 20/00 |
| 2020/0327317 | A1* | 10/2020 | Park ....................... G05D 1/021 |

FOREIGN PATENT DOCUMENTS

| | | |
|---|---|---|
| JP | 2016068754 A | 5/2016 |
| WO | 2017141396 A1 | 8/2017 |

* cited by examiner

VEHICLE CONTROL SYSTEM

CROSS-REFERENCE TO RELATED APPLICATION

The present application is based on, and claims priority from, Japanese Patent Application Serial Number 2019-206826, filed Nov. 15, 2019, the disclosure of which is hereby incorporated by reference herein in its entirety.

BACKGROUND

Field

The present disclosure relates to a vehicle control system that controls a vehicle performing automated driving.

Background

WO 2017/141396A discloses a technology relating to a vehicle control device for automatically controlling at least steering of a vehicle so that the vehicle travels along a route to a destination. JP2006-1369A discloses a technique related to a Pre-Crash Safety system (PCS). The pre-crash safety system of this technique realizes the function of judging the situation of the own vehicle in which a collision is unavoidable in advance and activating safety equipment early to reduce the collision damage.

SUMMARY

Consider a case where preventive safety control, such as the pre-crash safety system described in JP2006-1369A, which determines the driving environment around the vehicle in advance and intervenes in the control amount of vehicle driving control, is applied to a vehicle that performs the automated driving control described in WO 2017/141396A. During automated driving by the automated driving control, steering, acceleration and deceleration of the vehicle are controlled so as to follow the generated target trajectory.

For example, a waiting passenger may be standing by the shoulder at a boarding and alighting area for commercial vehicles. Passengers in such waiting areas, unlike those standing beside a crosswalk, are very unlikely to proceed to the road afterwards. However, when the vehicle travels the trajectory approaching the vehicle on the roadside of such boarding and alighting areas in the automated driving control, in the preventive safety control, waiting passengers may be recognized as an avoidance object and may intervene to the control amount. Therefore, if the intervention by the preventive safety control is allowed on the same basis as other areas in a specific area in which substantial safety is predicted, smooth running of the vehicle may be hindered. Thus, preventive safety control during automated driving has room for flexible response according to its travel area.

The present disclosure has been made in view of the above-mentioned problems, and an object thereof is to provide a vehicle control system capable of optimizing preventive safety control for a vehicle during automated driving.

In order to solve the above problems, the first disclosure is applied to a vehicle control system for controlling a vehicle capable of performing automated driving.

The vehicle control system includes a first controller configured to generate a target trajectory for the automated driving based on a travel plan of the vehicle, and a second controller configured to execute vehicle travel control that controls steering, acceleration, and deceleration of the vehicle such that the vehicle follows the target trajectory. During the automated driving, the second controller is configured to control a travel control amount which is a control amount of the vehicle travel control, acquire driving environment information indicating a driving environment around the vehicle, and execute preventive safety control for intervening in the travel control amount so as to prevent or avoid a collision between the vehicle and an obstacle based on the driving environment information. The first controller includes a memory device in which information of an intervention suppression area indicating a geographical area for suppressing the intervention of the travel control amount by the preventive safety control is stored. When the vehicle travels in the intervention suppression area during the automated driving, the first controller is configured to output a suppression instruction for the preventive safety control to the second controller. And the second controller is configured to suppress intervention of the travel control amount by the preventive safety control when the suppression instruction is received.

The second disclosure has the following further features in the first disclosure.

In the preventive safety control, the second controller is configured to inhibit an operation of the preventive safety control when the suppression instruction is received.

The third disclosure has the following further features in the first disclosure.

In the preventive safety control, the second controller is configured to delay an operation timing of the preventive safety control when the suppression instruction is received, compared to when the suppression instruction is not received.

The fourth disclosure has the following further features in the first disclosure.

The vehicle includes a commercial vehicle that stops at a stop area. The target trajectory includes a trajectory that stops at the stop area. The intervention suppression area includes a specific area around the stop area.

The fifth disclosure has the following further features in the first disclosure.

The target trajectory includes a trajectory facing a blind area formed by a specific obstacle. And the intervention suppression area includes a specific area around the blind area.

The sixth disclosure is applied to a vehicle control system for controlling a vehicle capable of performing automated driving.

The vehicle control system includes a first controller configured to generate a target trajectory for the automated driving based on a travel plan of the vehicle, and a second controller configured to execute vehicle travel control that controls steering, acceleration, and deceleration of the vehicle such that the vehicle follows the target trajectory. During the automated driving, the second controller is configured to control a travel control amount which is a control amount of the vehicle travel control, acquire driving environment information indicating a driving environment around the vehicle, and execute preventive safety control for intervening in the travel control amount so as to prevent or avoid a collision between the vehicle and an obstacle based on the driving environment information. The target trajectory includes passage of a signalized intersection upon which a traffic light is provided. The first controller includes a memory device in which information of an intervention suppression area, which is a geographical area for suppressing the intervention in the travel control amount by the preventive safety control, is stored. In the case of passing through the signalized intersection during the automated driving, the first controller is configured to output a suppression instruction to the second controller when the vehicle travels through the intervention suppression area and the traffic light is an indication of priority travel. And the second controller is configured to suppress intervention of the travel control amount by the preventive safety control when the suppression instruction is received.

According to the vehicle control system of the present disclosure, the first controller stores information of the intervention suppression area. When the vehicle travels in the intervention suppression area, the first controller outputs the suppression instruction to the second controller. As a result, the second controller suppresses the intervention of the travel control amount in the preventive safety control, so that it is possible to optimize the preventive safety control based on the travel area.

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

Figure 1:
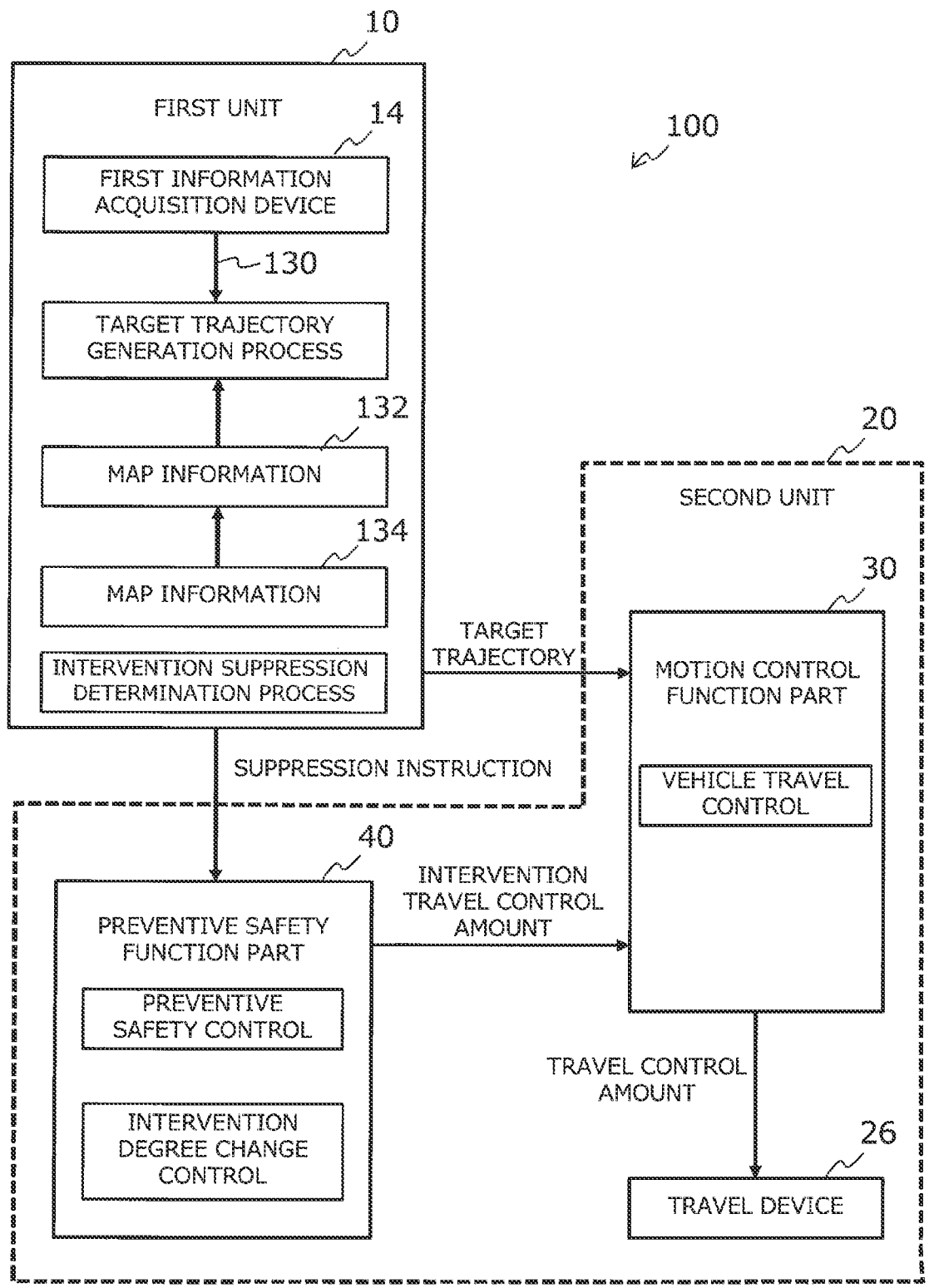
FIG. 1 is a block diagram showing a configuration example for explaining an outline of the vehicle control system according to first embodiment.

1. First Embodiment 1-1. Overall Configuration of Vehicle Control System of First Embodiment First, a schematic configuration of a vehicle control system according to the present embodiment will be described. FIG. 1 is a block diagram showing a configuration example for explaining an outline of the vehicle control system according to the first embodiment. A vehicle control system 100 shown in FIG. 1 is mounted on, for example, a commercial vehicle. Hereinafter, the vehicle in which the vehicle control system 100 is mounted is also referred to as a vehicle M1. Examples of the vehicle M1 include trucks and vans used for transporting cargo, buses and taxis used for transporting passengers, and the like.

The vehicle M1 is a vehicle with an automated driving function capable of executing automated driving by the vehicle control system 100. As the automated driving in this case, automated driving of level 3 or higher in the level definition of SAE (Society of Automotive Engineers) is assumed. A power source of the vehicle M1 is not limited.

The vehicle control system 100 controls the vehicle M1. Alternatively, at least a portion of the vehicle control system 100 may be located on an external device external to the vehicle and remotely control the vehicle. That is, the vehicle control system 100 may be distributed to the vehicle M1 and an external device.

As shown in FIG. 1, the vehicle control system 100 is configured to include a first unit 10 and a second unit 20. The first unit 10 is an automated driving device for performing management of automated driving of the vehicle M1. The second unit 20 is a vehicle traveling device for performing vehicle traveling control of the vehicle M1. The first unit 10 and the second unit 20 may be physically separate devices or may be the same device. If the first unit 10 and the second unit 20 are physically separate devices, they exchange the necessary information via communications. Functions of these devices will be described below.

The first unit 10 includes a first information acquisition device 14. The first information acquisition device 14 acquires various information using sensors mounted on the vehicle M1. Information acquired by the sensors mounted on the vehicle M1 is information indicating a driving environment of the vehicle M1. In the following description, this information is referred to as "driving environment information 130". The driving environment information 130 includes vehicle position information indicating a position of the vehicle M1, vehicle state information indicating a state of the vehicle M1, surrounding situation information indicating a surrounding situation of the vehicle M1, traffic environment information indicated by traffic lights, and the like.

The first unit 10 has a function for executing a target trajectory generation process. In the target trajectory generation processing, map information 132 is used. The map information 132 includes various information associated with the position. The map information 132 is not limited to general road maps or navigation maps, and may include map information of various viewpoints. For example, the map information 132 may include the position of a stationary object on a road, such as a guardrail, or a wall, a road surface, a white line, a pole, or a characteristic object such as a signboard.

The first unit 10 generates a travel plan of the vehicle M1 during automated driving based on the map information 132 and the driving environment information 130. The travel plan includes maintaining a current travel lane, making lane changes, avoiding obstacles, overtaking a preceding vehicle, stopping by shifting to a road shoulder, and so forth. Then, the first unit 10 generates a target trajectory for the vehicle M1 to travel in accordance with the travel plan.

Here, the target trajectory includes a set of target positions [Xi, Yi] of the vehicle M1 in a road on which the vehicle M1 travels. Incidentally, an X-direction is a forward direction of the vehicle M1, and a Y-direction is a plane direction orthogonal to the X-direction. The target trajectory may further include a target velocity [VXi, VYi] for each target position [Xi, Yi]. The first unit 10 outputs the generated target trajectory to the second unit 20.

The second unit 20 includes a motion control function part 30 for performing vehicle travel control of the vehicle M1. In the vehicle travel control, the motion control function part 30 controls the control amount related to steering, acceleration, and deceleration of the vehicle M1. Their control amounts are hereinafter referred to as "travel control amount". During automated driving of the vehicle M1, the motion control function part 30 of the second unit 20 receives the target trajectory from the first unit 10. Basically, the motion control function part 30 controls the travel control amount of the vehicle M1 so that the vehicle M1 follows the target trajectory. Typically, the motion control function part 30 calculates the deviation between various state amount of the vehicle M1 and the target trajectory (e.g., lateral deviation, yaw angle deviation, velocity deviation, and so forth). Then, the motion control function part 30 calculates the travel control amount such that the deviation decreases.

The calculated travel control amount is output to a travel device 26. The travel device 26 includes a device for driving, braking, and turning the vehicle M1. The travel device 26 controls the traveling of the vehicle M1 based on the input travel control amount.

The second unit 20 further includes a preventive safety function part 40 for performing preventive safety control of the vehicle M1. In the preventive safety control, the preventive safety function part 40 intervenes in the vehicle control amount of the vehicle M1 for the purpose of preventing, avoiding, or reducing the collision between the vehicle M1 and obstacles. Examples of such preventive safety control include Pre-Crash Safety (PCS) control, lane departure prevention control, vehicle stability control, and the like. The pre-crash safety control supports the avoidance of collision between the vehicle M1 and a surrounding object to be avoided (namely, an avoidance target). The lane departure prevention control prevents departure of the vehicle M1 from the driving lane. The vehicle stability control prevents unstable behavior such as vehicle spin. The preventive safety control also includes risk avoidance control for controlling the vehicle control amount of the vehicle M1 at a timing faster than the Pre-Crash Safety (PCS) control in preparation for a possible risk in the future.

Figure 2:
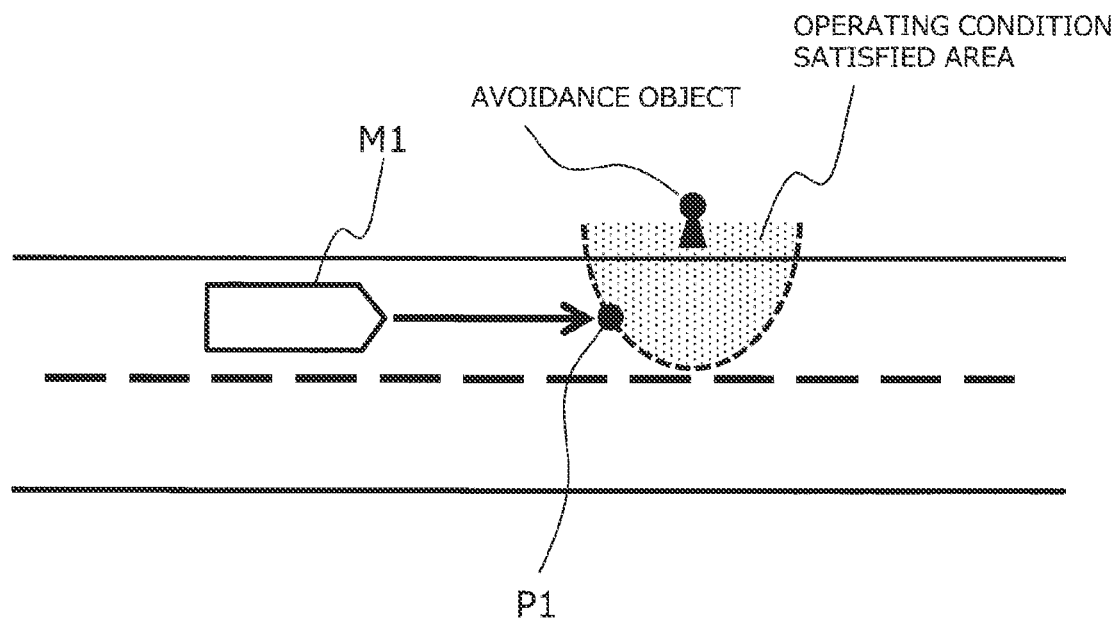
FIG. 2 is a diagram schematically showing an example of an operating condition satisfied area.

In the pre-crash safety control, the preventive safety function part 40 determines whether an operation condition of the pre-clash safety control is satisfied based on the driving environment information indicating the driving environment of the vehicle M1. Here, for example, the operating condition is that a TTC (Time To Collision) from the vehicle M1 to the avoidance target is smaller than a predetermined threshold value. FIG. 2 is a diagram schematically showing an example of an operating condition satisfied area. In the example shown in FIG. 2, when the vehicle M1 enters an operating condition satisfied area at the position P1, the preventive safety function part 40 calculates a travel control amount for avoiding a collision to the avoidance target. The travel control amount calculated by the preventive safety function part 40 is hereinafter referred to as an "intervention travel control amount". The calculated intervention travel control amount is output to the motion control function part 30.

Basically, the motion control function part 30 calculates the travel control amount of the vehicle M1 so that the vehicle M1 follows the target trajectory. However, when the intervention travel control amount is input from the preventive safety function part 40, the motion control function part 30 outputs the input intervention travel control amount to the travel device 26.

1-2. Features of Vehicle Control System of First Embodiment

Figure 3:
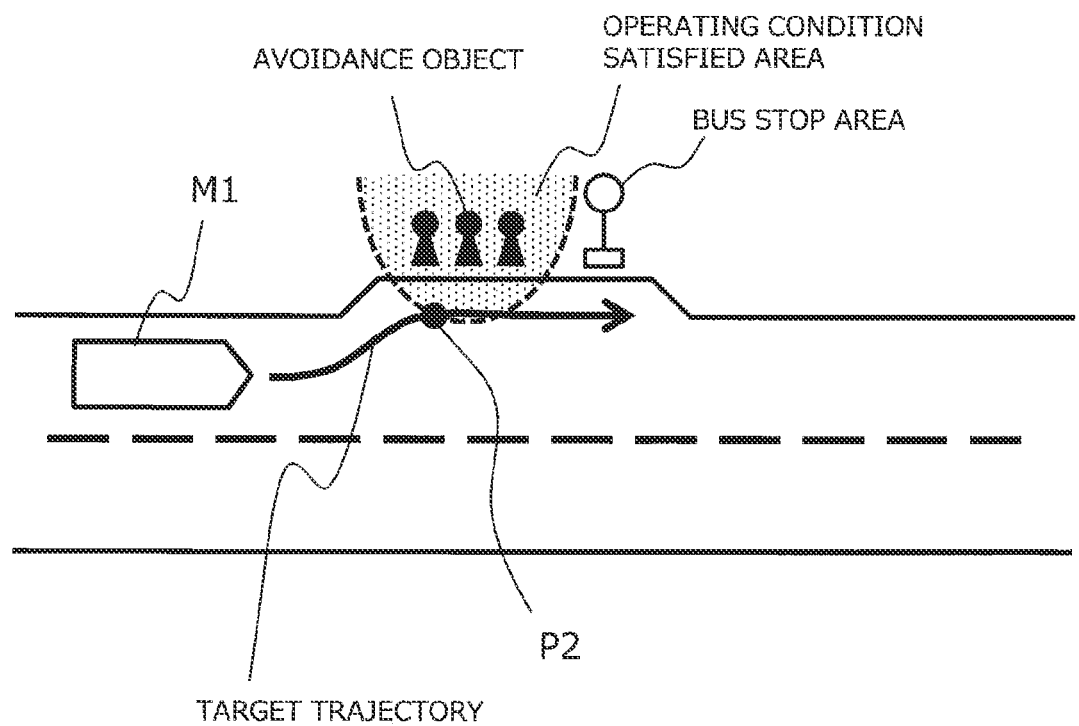
FIG. 3 is a diagram showing a situation where the vehicle M1 as a commercial bus stops close to a bus stop area.

Next, the features of the vehicle control system of the present embodiment will be described. As an example, FIG. 3 shows a situation where the vehicle M1 as a commercial bus stops close to a bus stop area. Unlike people trying to cross roads, passengers lined up at a bus stop area are very unlikely to move to roads. However, as shown in FIG. 3, when the target trajectory is generated in which the vehicle M1 stops at the bus stop area while approaching passengers in line at the bus stop area, the passengers lined up at the bus stop area may be determined to be the avoidance target and the operation condition of the preventive safety control may be satisfied at the position P2. As described above, in the travel area of the vehicle M1, there is an area in which the operation condition of the preventive safety control is easily satisfied even though the necessity of intervention of the preventive safety control is originally low.

In the vehicle control system 100 of the present embodiment, the preventive safety control is optimized using the travel area of the vehicle M1 as an index. More specifically, the first unit 10 has a function for executing an intervention suppression determination process for determining whether it is necessary to suppress the intervention of the preventive safety control. In the intervention suppression determination process, an intervention suppression area information 134 is used. The intervention suppression area information 134 is information in which a geographic region (hereinafter referred to as an "intervention suppression area") in which intervention of preventive safety control is to be suppressed is associated with map information (location information). Typically, the intervention suppression area corresponds to a specific area in which substantial safety is expected, such as around a stop area or a boarding and alighting area for a passenger transport vehicle, an unloading area of a freight vehicle, an evacuation area of a road shoulder, or the like.

Figure 4:
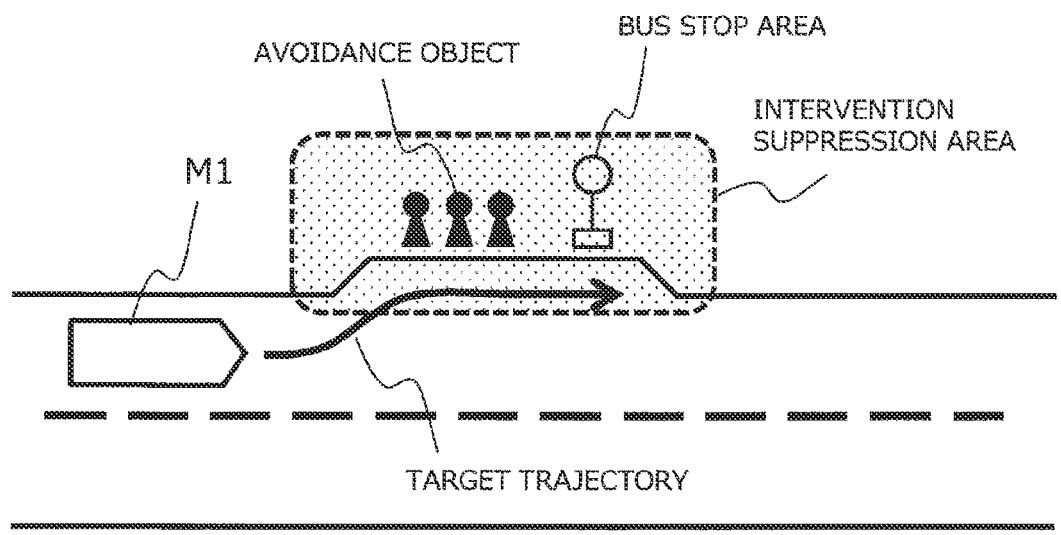
FIG. 4 is a diagram illustrating an intervention suppression area.

FIG. 4 is a diagram illustrating an intervention suppression area. The first unit 10 specifies such an intervention suppression area in advance, and stores it as the intervention suppression area information 134 associated with the map information. In the intervention suppression determination process, it is determined whether the vehicle M1 traveling following the target trajectory enters the intervention suppression area. When this determination is satisfied, the first unit 10 outputs a suppression instruction to the second unit 20.

Based on the suppression instruction received from the first unit 10, the preventive safety function part 40 of the second unit 20 changes an intervention degree of the preventive safety control to a lower direction, that is, a direction in which the intervention is suppressed. In the following description, this control is referred to as "intervention suppression control". The intervention degree here indicates the degree of intervention of the preventive safety control with respect to the travel control amount calculated based on the target trajectory. Changes in the intervention degree can be controlled by changing the operating conditions of the preventive safety control (e.g., operation threshold, operation timing) and an operation amount.

Figure 5:
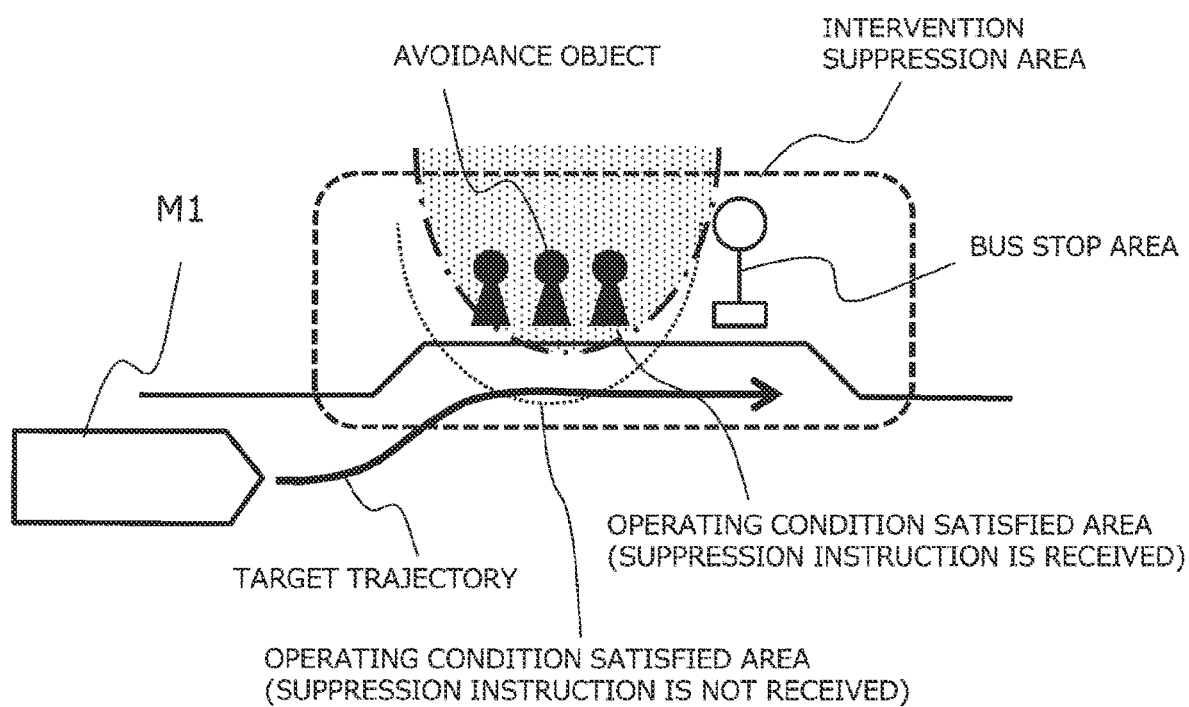
FIG. 5 is a diagram showing an example of an operation timing of the preventive safety control when the vehicle M1, as a commercial bus, approaches and stops at a bus stop area.

FIG. 5 shows an example of an operation timing of the preventive safety control when the vehicle M1, as a commercial bus, approaches and stops at a bus stop area. For example, as shown in FIG. 5, in the case where the surrounding of the bus stop area is set as the intervention suppression area, the second unit 20 changes the region where the operation condition is satisfied for the avoidance target (here, the person) in accordance with the suppression instruction to be smaller than that in the case where the suppression instruction is not received.

As described above, the preventive safety function part 40 changes the operation condition so that the operation timing of the preventive safety control is delayed in the intervention suppression area compared to the outside of the intervention suppression area. This makes it possible to suppress the operation of the preventive safety control in the area where the safety is substantially secured, and to secure the safety in the other areas by the operation of the preventive safety control.

Hereinafter, the detailed configuration and operation of the vehicle control system 100 according to the present embodiment will be described in more detail.

1-3. Detailed Configuration Example of First Unit 10

Figure 6:
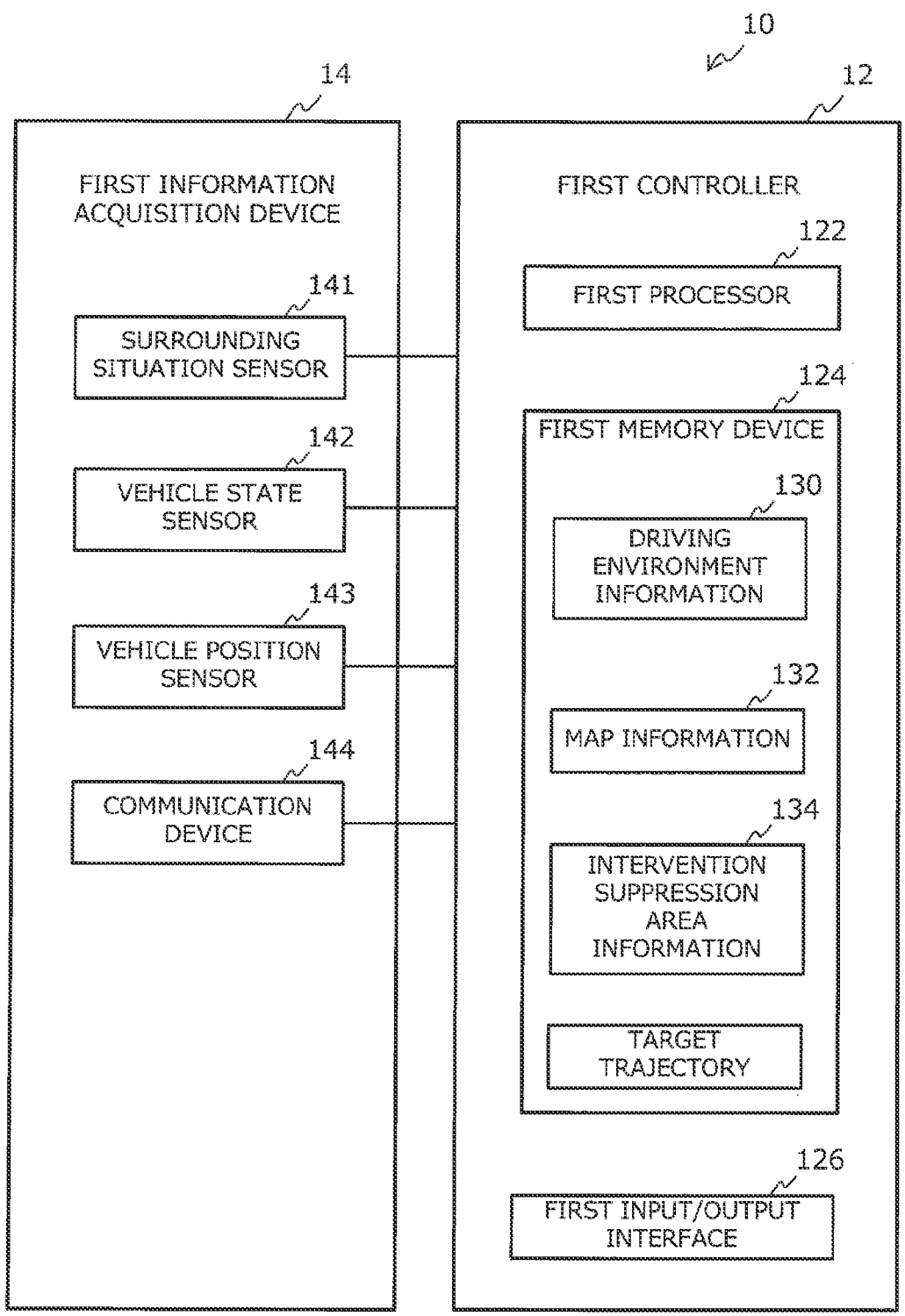
FIG. 6 is a block diagram showing a configuration example of a first unit according to the first embodiment.

FIG. 6 is a block diagram showing a configuration example of the first unit according to the present embodiment. As shown in FIG. 6, the first unit 10 includes a first controller 12 for managing the automated driving of the vehicle M1. Further, the first unit 10 includes a first information acquisition device 14 connected to the input side of the first controller 12.

The first information acquisition device 14 includes a surrounding situation sensor 141, a vehicle state sensor 142, a vehicle position sensor 143, and a communication device 144.

A surrounding situation sensor 141 recognizes surrounding situation information of the vehicle M1. For example, the surrounding situation sensor 141 is exemplified a camera (imaging device), a LIDAR: Laser Imaging Detection and Ranging, a radar, and so forth. The surrounding situation information includes target information about a target recognized by the surrounding situation sensor 141. The target is exemplified by a surrounding vehicle, a pedestrian, a roadside structure, an obstacle, a white line, a signal, and the like. The target information includes information on a relative position and a relative velocity of the target with respect to the vehicle M1. The surrounding situation information recognized by the surrounding situation sensor 141 is transmitted to the first controller 12 at any time.

The vehicle state sensor 142 detects vehicle information indicating a state of the vehicle M1. For example, the vehicle state sensor 142 includes a vehicle speed sensor, a lateral acceleration sensor, a yaw rate sensor, and the like. The vehicle information detected by the vehicle state sensor 142 is transmitted to the first controller 12 at any time.

The vehicle position sensor 143 detects a position and an orientation of the vehicle M1. For example, the vehicle position sensor 143 includes a GPS (Global Positioning System) sensor. The GPS sensor receives a signal transmitted from a plurality of GPS satellites, and calculates the position and the orientation of the vehicle M1 based on the received signal. The vehicle position sensor 143 may perform well-known self-position estimation process (localization) to increase accuracy of the present position of the vehicle M1. The vehicle information detected by the vehicle position sensor 143 is transmitted to the first controller 12 at any time.

The communication device 144 communicates with the outside of the vehicle. For example, the communication device 144 communicates with an external device outside of the vehicle M1 via a communication network. For example, the external device includes a roadside unit, a surrounding vehicle, a surrounding infrastructure, and the like. The roadside unit is a beacon device that transmits, for example, traffic jam information, traffic information by lane, restriction information such as pause, information on traffic conditions at blind positions, and the like. Further, when the external device is a surrounding vehicle, the communication device 144 performs vehicle-to-vehicle communication (V2V communication) with the surrounding vehicle. Further, when the external device is a surrounding infrastructure, the communication device 144 performs vehicle-to-infrastructure communication (V2I communication) with the surrounding infrastructure.

The first controller 12 is an information processing device that perform various processes in the vehicle control system 100. More specifically, the first controller 12 is a microcomputer having a first processor 122, a first memory device 124, and a first input/output interface 126. The first controller 12 is also referred to as an Electronic Control Unit (ECU).

Various kinds of information are stored in the first memory device 124. For example, the driving environment information 130 acquired by the first information acquisition device 14 is stored in the first memory device 124. For example, the first memory device 124 includes a volatile memory, a non-volatile memory, and a hard disk drive (HDD).

The first memory device 124 stores map information 132 including detailed road information. The map information 132 includes, for example, information on a shape of a road, a number of lanes, a lane width, and the like. Alternatively, the map information 132 may be stored in an external management server. In this case, the first controller 12 communicates with the management server to acquire necessary map information 132. The acquired map information 132 is stored in the first memory device 124.

The first memory device 124 stores intervention suppression area information 134. The intervention suppression area information 134 includes position information (map information) of the intervention suppression area. The intervention suppression area information 134 may include information about targets in the area. The intervention suppression area information 134 may be stored in an external management server. In this case, the first controller 12 communicates with the management server to acquire necessary intervention suppression area information 134. The acquired intervention suppression area information 134 is stored in the first memory device 124.

The first processor 122 executes automated driving software, which is a computer program. The automated driving software is stored in the first memory device 124. Alternatively, the automated driving software is recorded on a computer-readable recording medium. The functions of the first controller 12 is realized by the first processor 122 executing the automated driving software.

The first controller 12 performs management of the automated driving of the vehicle M1. Typically, the first controller 12 performs a target trajectory generation process for generating a target trajectory for the automated driving of the vehicle M1.

The first input/output interface 126 is an interface for exchanging information with the second unit 20. The automated driving information and the target trajectory generated by the first controller 12 are output to the second unit 20 via the first input/output interface 126.

1-4. Target Trajectory Generation Process

Figure 7:
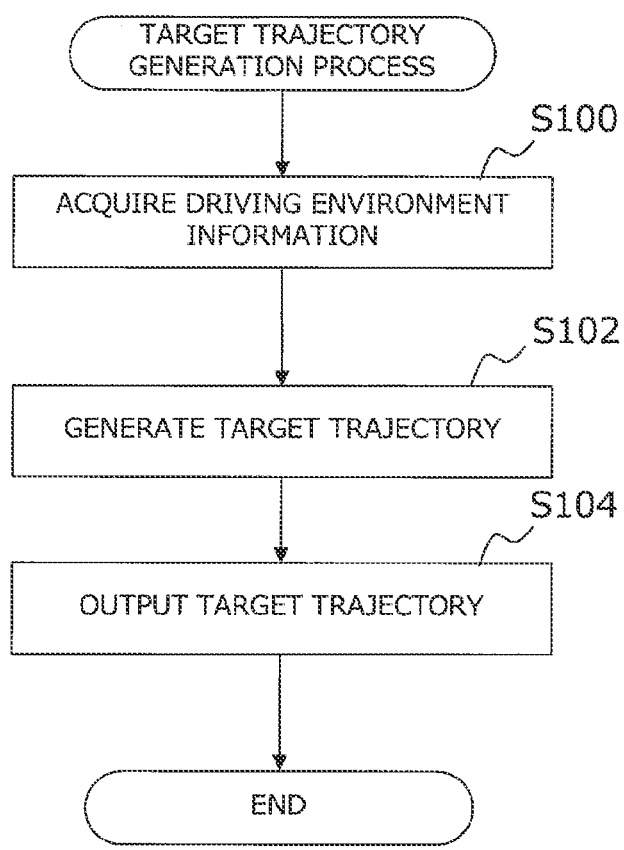
FIG. 7 is a flowchart showing a control routine of a target trajectory generation process executed in a first controller of the first unit according to the first embodiment.

FIG. 7 is a flowchart showing a control routine of a target trajectory generation process executed in the first controller of the first unit according to the present embodiment. The control routine shown in FIG. 7 is repeatedly executed at a predetermined control period during the automated driving of the vehicle M1.

In the control routine shown in FIG. 7, first in step S100, the first controller 12 acquires the driving environment information 130 from the first information acquisition device 14. The driving environment information 130 is stored in the first memory device 124.

Next in step S102, the first controller 12 generates a target trajectory for the automated driving of the vehicle M1 based on the map information 132 and the driving environment information 130. More specifically, the first controller 12 generates a travel plan of the vehicle M1 during the automated driving, based on the map information 132 and the driving environment information 130. The first controller 12 generates the target trajectory for the vehicle M1 to travel according to the generated travel plan based on the driving environment information 130. The generated target trajectory is stored in the first memory device 124.

For example, the first controller 12 generates a target trajectory for stopping the vehicle M1 at a stop area. More specifically, the first controller 12 recognizes a stop area as a destination and a person or a structure around the stop area based on the map information 132, the vehicle position information, and the surrounding situation information. Then, the first controller 12 generates a target trajectory for stopping at the stop area while avoiding the surrounding people and structures, based on these information.

The first controller 12 outputs the generated target trajectory to the second unit 20 via the first input/output interface 126 in step S104. Each time the target trajectory is updated, the latest target trajectory is output to the second unit 20.

1-5. Intervention Suppression Determination Process

Figure 8:
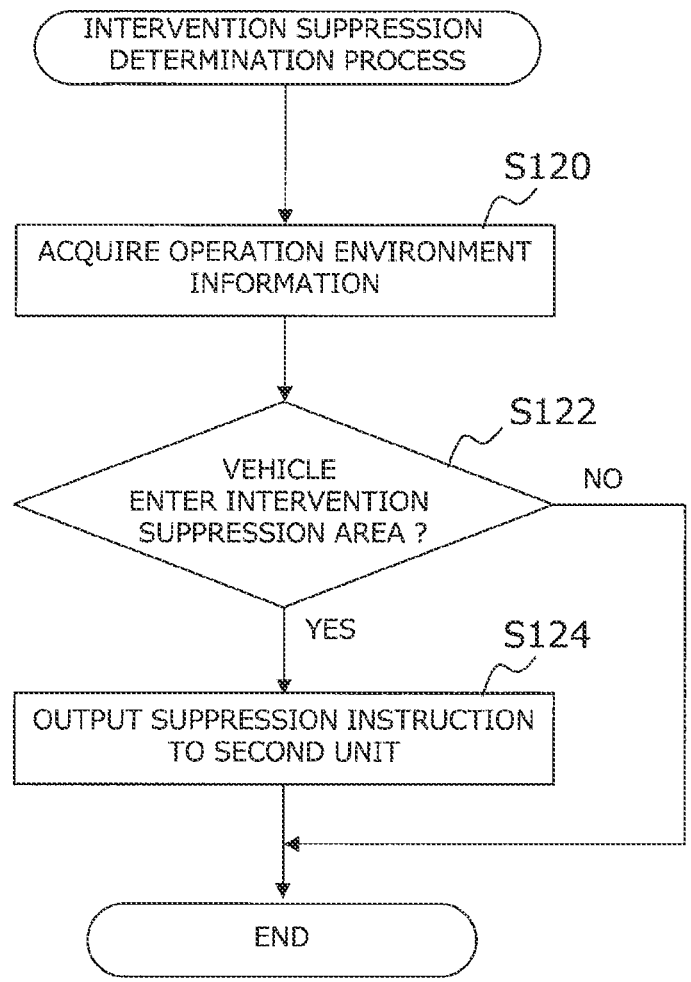
FIG. 8 is a flowchart showing a control routine of the intervention suppression determination process executed in the first controller according to the first embodiment.

FIG. 8 is a flowchart showing a control routine of the intervention suppression determination process executed in the first controller according to the present embodiment. The control routine shown in FIG. 8 is repeatedly executed at a predetermined control cycle during automated driving of the vehicle M1.

In the control routine shown in FIG. 8, first in step S120, the first controller 12 acquires the driving environment information 130 from the first information acquisition device 14. The driving environment information 130 is stored in the first memory device 124.

Next in step S122, the first controller 12 determines whether the vehicle M1 enters the intervention suppression area based on the vehicle position information included in the driving environment information 130 and the intervention suppression area information stored in the first memory device 124. As a result, if the vehicle M1 does not enter the intervention suppression area, the routine is terminated. On the other hand, if the vehicle M1 enters the intervention suppression area, the first controller 12 outputs a suppression instruction to the second unit 20 via the first input/output interface 126, in step S124.

1-6. Detailed Configuration Example of Second Unit 20

Figure 9:
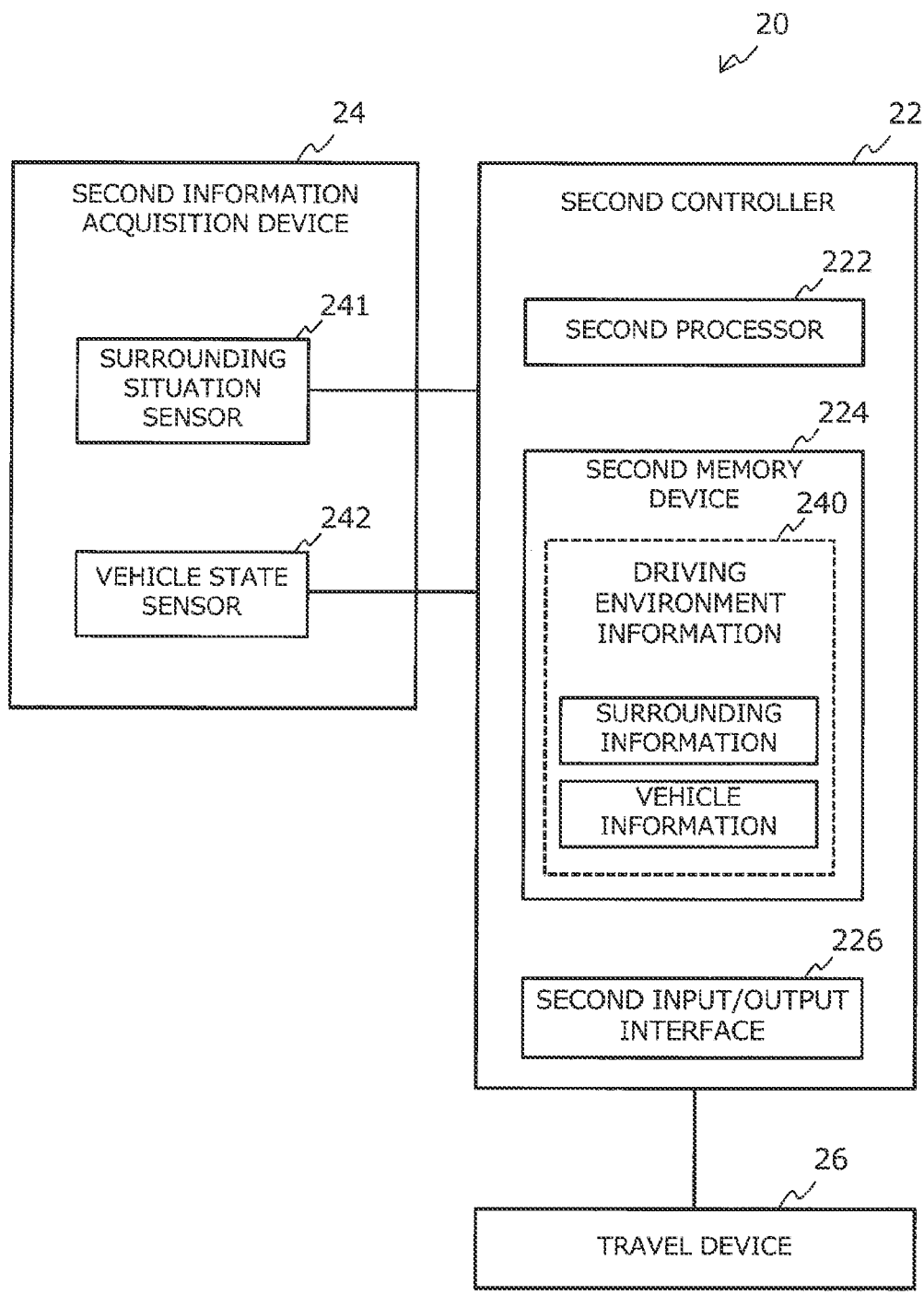
FIG. 9 is a block diagram showing a configuration example of a second unit according to the first embodiment.

FIG. 9 is a block diagram showing a configuration example of the second unit according to the present embodiment. As shown in FIG. 9, the second unit 20 includes a second controller 22, a second information acquisition device 24, and a travel device 26.

The second information acquisition device 24 is configured to include a surrounding situation sensor 241 and a vehicle state sensor 242.

A surrounding situation sensor 241 recognizes surrounding situation information of the vehicle M1. The surrounding situation sensor 241 is exemplified by, for example, a camera (imaging device), a LIDAR: Laser Imaging Detection and Ranging, a radar, and so forth. The surrounding situation information includes target information about a target recognized by the surrounding situation sensor 241. The target is exemplified by a surrounding vehicle, a pedestrian, a roadside structure, an obstacle, a white line, a signal, and the like. The target information includes information on a relative position and a relative velocity of the target with respect to the vehicle M1. The surrounding situation information recognized by the surrounding situation sensor 241 is transmitted to the second controller 22 at any time.

The vehicle state sensor 242 detects vehicle information indicating a state of the vehicle M1. For example, the vehicle state sensor 242 includes a vehicle speed sensor, a lateral acceleration sensor, a yaw rate sensor, and the like. The vehicle information detected by the vehicle state sensor 242 is transmitted to the second controller 22 at any time. In the following description, the surrounding situation information and the vehicle information acquired by the second information acquisition device 24 are referred to as "driving environment information 240".

The first information acquisition device 14 and the second information acquisition device 24 may be partially shared. For example, the surrounding situation sensor 141 and the surrounding situation sensor 241 may be common. The vehicle state sensor 142 and the vehicle state sensor 242 may be common. That is, the first unit 10 and the second unit 20 may share a part of the first information acquisition device 14 or the second information acquisition device 24. In this case, the first unit 10 and the second unit 20 exchange necessary information with each other.

In addition to the surrounding situation sensor 241 and the vehicle state sensor 242, the second information acquisition device 24 may further include the same devices as the vehicle position sensor 143, or the communication device 144.

The travel device 26 includes a steering device, a driving device, and a braking device. The steering device turns wheels of the vehicle M1. The driving device is a power source that generates a driving force of the vehicle M1. As the driving device, an engine or an electric motor is exemplified. The driving device is exemplified by an engine or an electric motor.

The second controller 22 is an information processing device that perform various processes in the vehicle control system 100. More specifically, the second controller 22 is a microcomputer having a second processor 222, a second memory device 224, and a second input/output interface 226. The second controller 22 is also referred to as an Electronic Control Unit (ECU).

Various kinds of information are stored in the second memory device 224. For example, the second memory device 224 stores the surrounding situation information and the vehicle information (driving environment information 240) acquired by the second information acquisition device 24. For example, the second memory device 224 includes a volatile memory, a non-volatile memory, and a hard disk drive (HDD)

The second processor 222 executes vehicle travel control software, which is a computer program. The vehicle travel control software is stored in the second memory device 224. Alternatively, the vehicle travel control software is recorded on a computer-readable recording medium. The function of the second controller 22 is realized by the second processor 222 executing the vehicle travel control software.

Specifically, the functions of the motion control function part 30 are realized by the second processor 222 executing the vehicle travel control software related to the vehicle travel control. In addition, the second processor 222 executes the vehicle travel control software related to the preventive safety control, thereby realizing the functions of the preventive safety function part 40. That is, the motion control function part 30 and the preventive safety function part 40 are incorporated in the second controller 22 as functions for performing the vehicle running control and the preventive safety control.

The motion control function part 30 and the preventive safety function part 40 may be incorporated in physically different controllers. In this case, the second unit 20 may be separately provided with a controller for the motion control function part 30 for performing vehicle travel control and a controller for the preventive safety function part 40 for performing preventive safety control.

The second input/output interface 226 is an interface for exchanging information with the first unit 10. The target trajectory and the automated driving information output from the first controller 12 are input to the second unit 20 via the second input/output interface 226.

1-7. Vehicle Travel Control

The second controller 22 executes the "vehicle travel control" that control the steering, the acceleration, and the deceleration of the vehicle M1. Typically, the second controller 22 executes the vehicle travel control by controlling an operation of the travel device 26. Specifically, the second controller 22 controls the steering of the vehicle M1 by controlling an operation of the steering device. The second controller 22 also controls the acceleration of the vehicle M1 by controlling an operation of the driving device. The second controller 22 controls the deceleration of the vehicle M1 by controlling an operation of the braking device.

In the vehicle travel control, the second controller 22 receives the target trajectory from the first unit 10 during the automated driving of the vehicle M1. Basically, the second controller 22 controls the travel control amount of the vehicle M1 such that the vehicle M1 follows the target trajectory. Typically, the motion control function part 30 calculates a deviation between various state amounts of the vehicle M1 and the target trajectory (e.g., lateral deviation, yaw angle deviation, speed deviation, etc.). Then, the motion control function part 30 executes the vehicle running control such that the deviation decreases.

1-8. Preventive Safety Control

Figure 10:
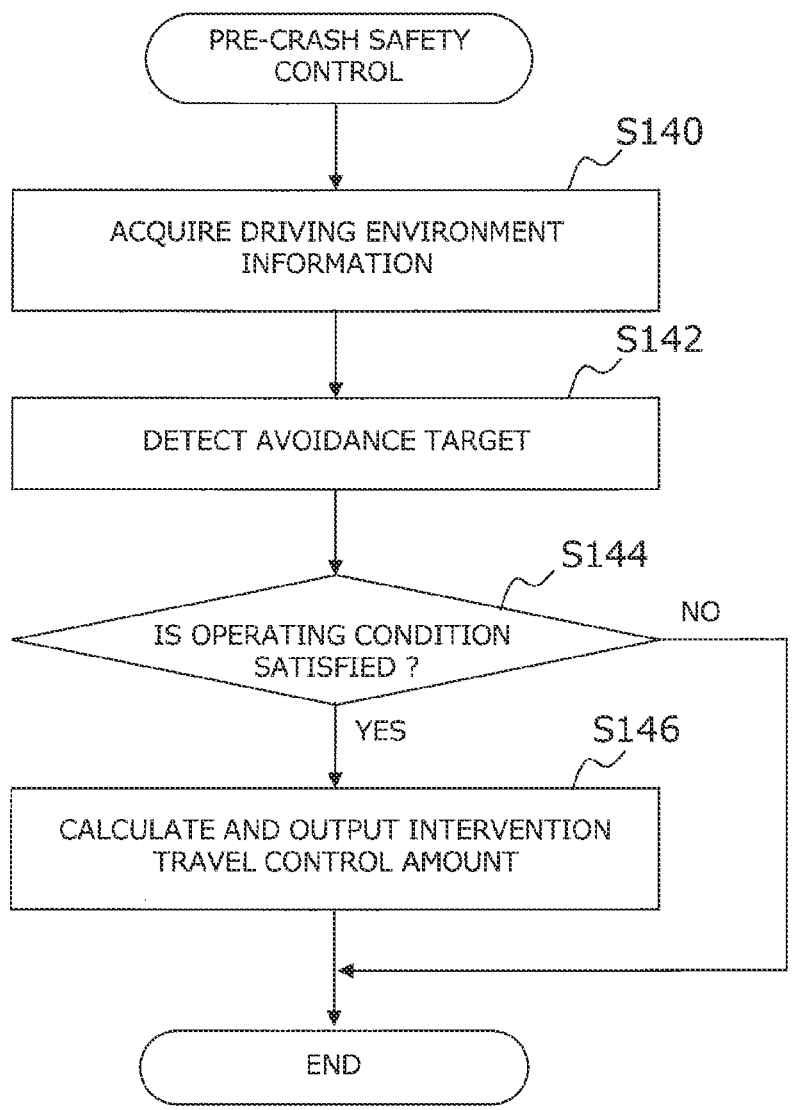
FIG. 10 is a flowchart showing a routine of processing relating to a pre-crash safety control executed in the second controller.

The second controller 22 performs preventive safety control to intervene in the travel control amount of the vehicle travel control for the purpose of improving the safety of the vehicle M1. Typically, the second controller 22 executes a pre-crash safety control to avoid a collision to the collision object of the vehicle M1 during the automated driving of the vehicle M1. FIG. 10 is a flowchart showing a routine of processing relating to the pre-crash safety control executed by the second controller 22. The second controller 22 repeatedly executes the routine shown in FIG. 10 at a predetermined control period during the automated driving of the vehicle M1.

When the routine shown in FIG. 10 is started, the second controller 22 acquires the driving environment information 240 from the second information acquisition device 24, in step S140. The acquired information is stored in the second memory device 224.

Next, in step S142, the second controller 22 detects the avoidance target based on the driving environment information 240. Next, in step S144, the second controller 22 determines whether the operating condition of the preventive safety control for the avoidance target is satisfied. Here, for example, the operating condition is that a TTC (Time To Collision) from the vehicle M1 to the avoidance target is smaller than a predetermined threshold value. As a result, when the operating condition is not satisfied, the processing of this routine is terminated. On the other hand, when the operating condition is satisfied, the second controller 22 calculates the intervention travel control amount for avoiding a collision to the avoidance target, in step S146. The calculated intervention travel control amount is output to the motion control function part 30.

Basically, the motion control function part 30 calculates the travel control amount of the vehicle M1 such that the vehicle M1 follows the target trajectory. However, when the intervention travel control amount is input from the preventive safety function part 40, the motion control function part 30 corrects the travel control amount based on the intervention travel control amount input from the preventive safety function part 40. Typically, when the intervention travel control amount is input from the preventive safety function part 40, the motion control function part 30 outputs the intervention travel control amount as the final travel control amount.

1-8. Intervention Suppression Control

In the preventive safety control during the automated driving, the second controller 22 of the present embodiment changes the intervention degree based on the suppression instruction.

Figure 11:
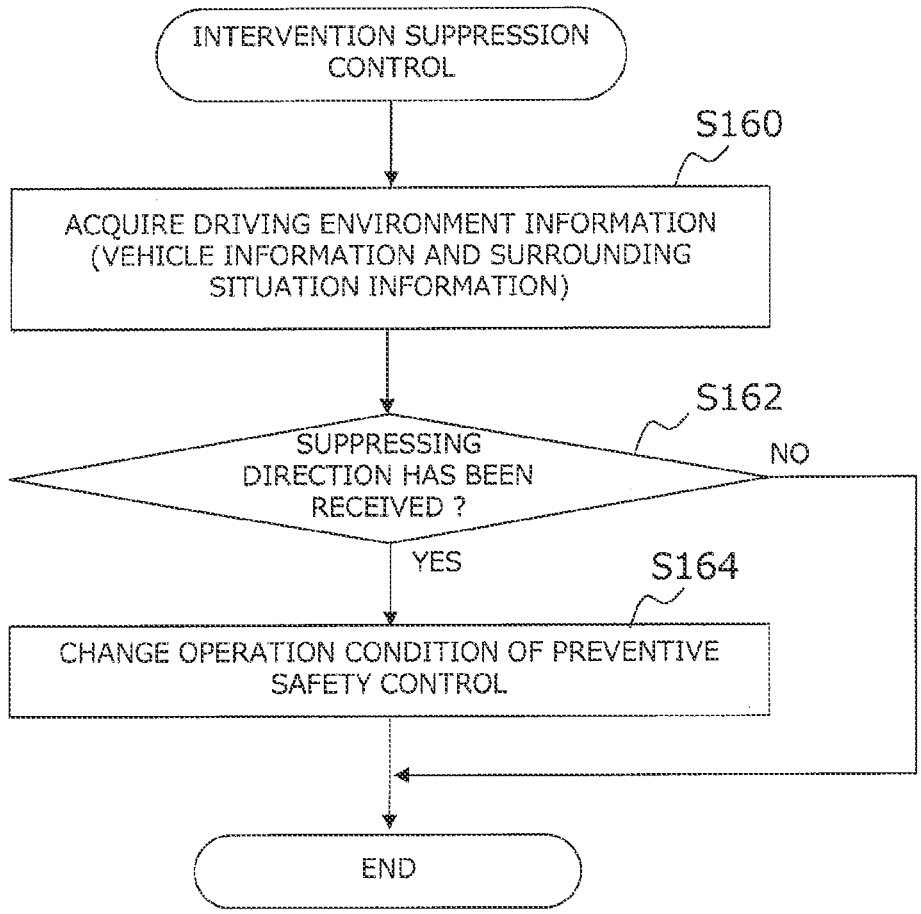
FIG. 11 is a flowchart showing a control routine of an intervention suppression control executed by the second controller.

FIG. 11 is a flowchart showing a control routine of the intervention suppression control executed by the second controller 22. The second controller 22, during the automated driving of the vehicle M1, repeatedly executes the routine shown in FIG. 11 at a predetermined control cycle.

When the routine shown in FIG. 11 is started, the second controller 22 acquires the driving environment information 240 (vehicle information and surrounding situation information) from the second information acquisition device 24, in step S160. The acquired information is stored in the second memory device 224.

Next, in step S162, the second controller 22 determines whether a suppression instruction has been received from the first unit 10 via the second input/output interface 226. As a result, when the suppression instruction has not been received, the routine is terminated.

On the other hand, when the suppression instruction is received in step S162, the second controller 22 changes the operation condition of the preventive safety control based on the suppression instruction in step S164. Here, the operation condition of the preventive safety control for the avoidance target recognized based on the driving environment information 240 is changed to a suppressing direction. Typically, the second controller 22 changes the threshold of the time to collision (TTC) for the avoidance object such that the operation timing of the preventive safety control is delayed. Alternatively, the second controller 22 prohibits the operation of the preventive safety control for the avoidance target.

As described above, according to the vehicle control system 100 of the first embodiment, it is possible to suppress the intervention of the preventive safety control within the predetermined intervention suppression area. Thereby, smooth traveling of the vehicle M1 in the intervention suppression area can be realized, and safety can be ensured by preventive safety control in the other areas.

1-10. Modified Examples

The vehicle control system 100 according to the first embodiment may be applied with configuration modified as described below.

The intervention suppression determination process may be configured to determine whether the vehicle M1 enters the intervention suppression area based on the target trajectory. In this case, the first controller 12 acquires the target trajectory by the target trajectory generation process shown in FIG. 7. Then, the first controller 12 determines whether the target trajectory is a path entering the intervention suppression area. When the target trajectory is a path entering the intervention suppression area, the first controller 12 may output a suppression instruction including a timing at which the vehicle M1 enters the intervention suppression area to the second unit 20 via the first input/output interface 126.

The preventive safety function part 40 may have a function of calculating a target trajectory instead of a function of calculating an intervention travel control amount. The target trajectory calculated by the preventive safety function part 40 is hereinafter referred to as an "intervention target trajectory". In this case, the calculated intervention target trajectory is output to the motion control function part 30. When an intervention target trajectory is input from the preventive safety function part 40, the motion control function part 30 may calculate the travel control amount based on the intervention target trajectory. This modified example can also be applied to the vehicle control system 100 of another embodiment to be described later.

Figure 12:
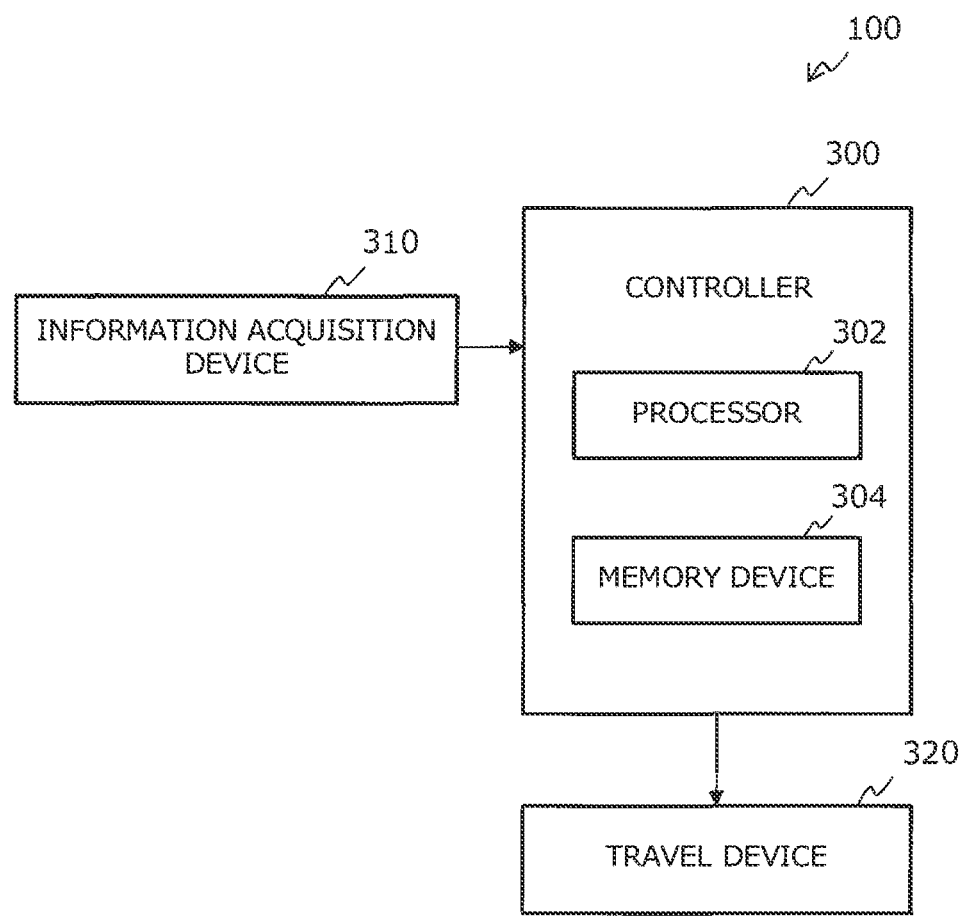
FIG. 12 is a diagram showing a modification of the configuration of the vehicle control system according to the first embodiment.

The first controller 12 and the second controller 22 may be configured as a single common controller. FIG. 12 is a diagram showing a modification of the configuration of the vehicle control system according to the present embodiment. The vehicle control system 100 includes a controller 300, an information acquisition device 310, and a travel device 320. The information acquisition device 310 includes the same functions as the first information acquisition device 14 and the second information acquisition device 24. The travel device 320 includes the same function as the travel device 26.

The controller 300 includes a function as a first controller 12 of the first unit 10, and a function as a second controller 22 of the second unit 20. The controller 300 includes a processor 302 and a memory device 304. The processor 302 executes the automated driving control software and the vehicle driving control software, which are computer programs. Each software is stored in the memory device 304. Alternatively, the software is recorded on a computer readable recording medium. That is, in the modification of the vehicle control system 100 shown in FIG. 12, the functions of the first controller 12 and the second controller 22 are realized by the processor 302 executing these software. This modification can also be applied to the vehicle control system 100 of another embodiment to be described later.

There is no limitation on the method of suppressing the preventive safety control in the intervention suppression control. That is, the second controller 22 is not limited to changing the operation threshold of the preventive safety control and changing the operation timing, and may be configured to change the intervention degree by changing the operation amount by the preventive safety control. Modifications may also be adopted as appropriate to the extent that it does not depart from the intent of the present disclosure.

The first unit 10 and the second unit 20 may be designed and developed separately. For example, the second unit 20, which is responsible for vehicle travel control, is designed and developed by developers (typically automobile manufacturer) familiar with mechanisms and vehicle motion characteristics. In this case, the reliability of the preventive safety function part 40 of the second unit 20 is extremely high. On the premise of utilizing the high-reliability preventive safety function part 40, an automated driving service provider can design and develop software for the first unit 10. In that sense, it can be said that the second unit 20 is a platform for automated driving services.

Figure 13:
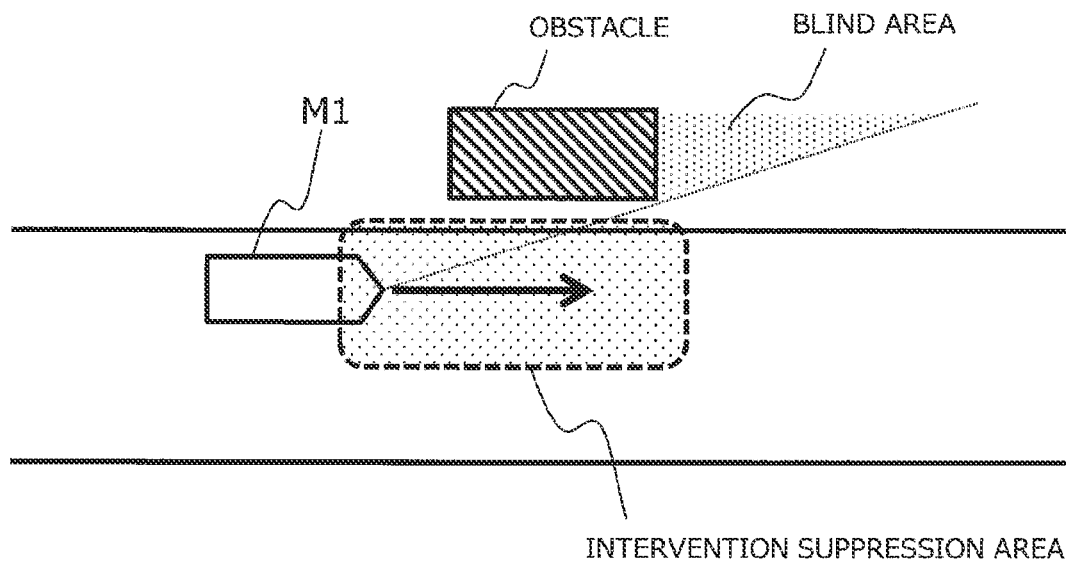
FIG. 13 is a diagram illustrating an intervention suppression area.

The intervention suppression area may include a specific area around a blind area. FIG. 13 is a diagram illustrating an intervention suppression area. As shown in FIG. 13, for example, a blind area from the vehicle M1 may be formed by a specific obstacle on a road shoulder. When a target trajectory facing such a blind area is generated, the second controller 22 may execute preventive safety control on the assumption that a collision caused by a person, a bicycle, or the like jumping out of the blind area is prevented in advance. However, for example, when the blind area is an area in which substantial safety is predicted based on environmental conditions, past results, and the like, it may become excessive preventive safety control. Therefore, in the case of the blind area in which specific conditions for predicting substantial safety are met, by setting a specific area around the blind area as an intervention suppression area, it is possible to prevent obstruction of traffic flow while ensuring substantial safety.

Figure 14:
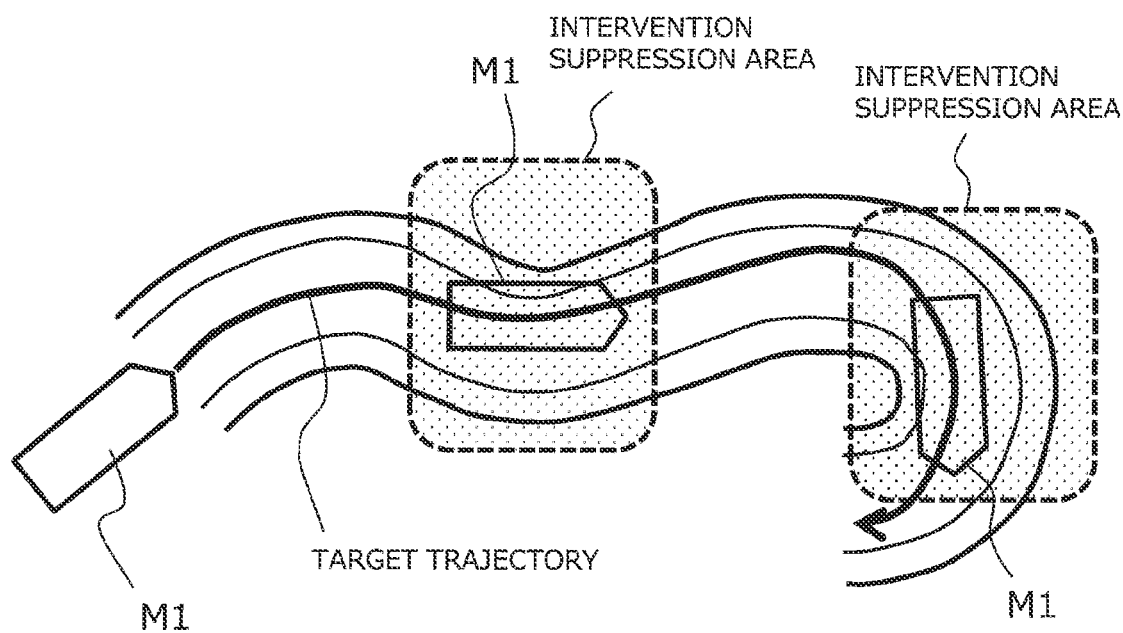
FIG. 14 is a diagram showing an example of a curve path including an intervention suppression area.

The intervention suppression area may include a specific area around a specific curve path. FIG. 14 is a diagram showing an example of a curve path including an intervention suppression area. The target trajectory of the curve path generated by the first controller 12 by the target trajectory generation process may generate a smooth trajectory effectively utilizing the lane width, such as the trajectory of manual driving by a person. In such a case, the second controller 22 may perform preventive safety control in response to the approach of the vehicle M1 to the road end. Such precautionary safety control interventions can also result in excessive support. Therefore, if it is a curve path in which substantial safety is predicted, by making a specific area around the curve path to be an intervention suppression area, it is possible to travel a smooth trajectory while ensuring substantial safety.

2. Second Embodiment

Next, the vehicle control system of the second embodiment will be described.

2-1. Configuration of Vehicle Control System According to Second Embodiment

Configuration of the vehicle control system according to the second embodiment is the same as the vehicle control system 100 of the first embodiment shown in FIG. 1. Therefore, a detailed description of the vehicle control system according to the second embodiment is omitted.

2-2. Functions of Vehicle Control System According to Second Embodiment

Figure 15:
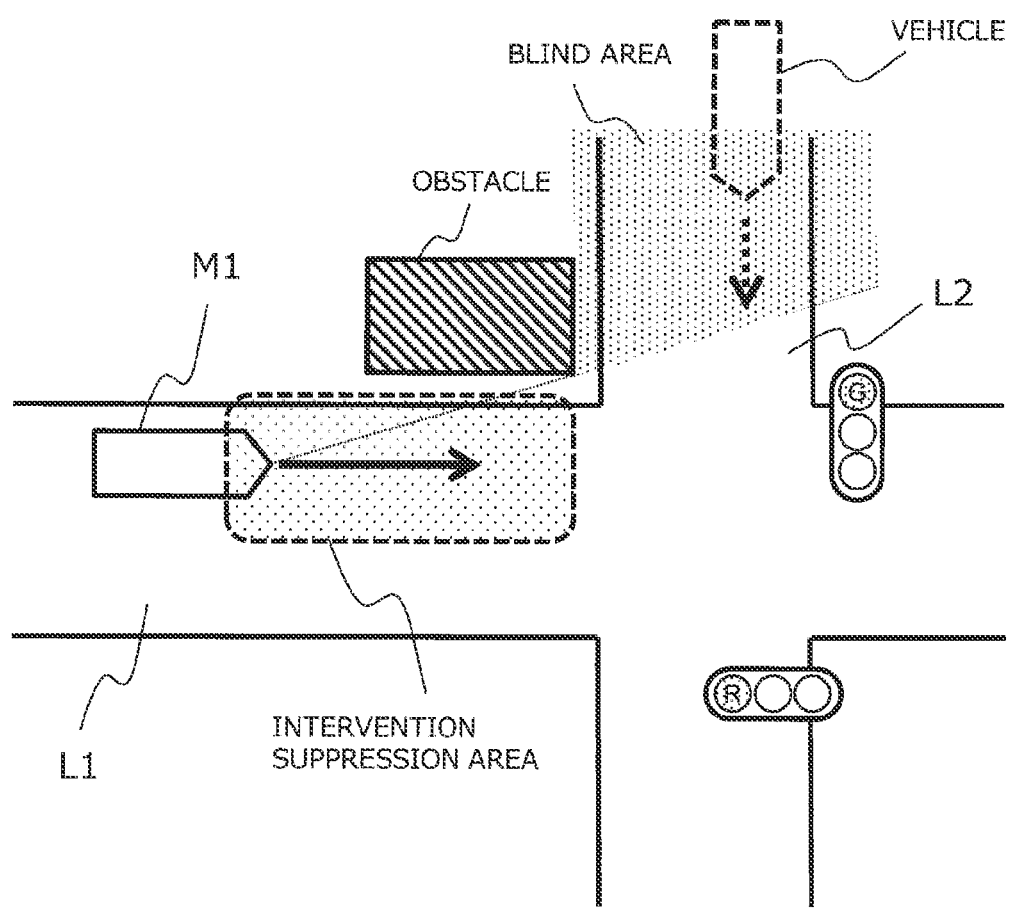
FIG. 15 is a diagram showing an example of an intersection including an intervention suppression area.

The vehicle control system 100 according to the second embodiment is characterized by an intervention suppression determination process in consideration of a traffic environment. FIG. 15 is a diagram showing an example of an intersection including an intervention suppression area. The intersection shown in FIG. 15 is a signalized intersection where a lane L1 and a lane L2 intersect, illustrating the case where a part of the lane L2 from the side of the lane L1 overlaps a blind area of an obstacle.

At the signalized intersection, when the signal of the lane L1 in which the vehicle M1 is traveling is a green signal display indicating the priority travel, and the signal of the lane L2 in which the other vehicle M2 is traveling is a red signal display indicating the non-priority travel (or stop), a traffic environment is such that the lane L1 has priority over lane L2. However, if the second controller 22 does not have a function of recognizing traffic lights, the second controller 22 is not capable of understanding the traffic environment due to the traffic lights. For this reason, the second controller 22 may execute the preventive safety control on the assumption of the vehicle entering from the blind area of the lane L2. Such an intervention of the preventive safety control may result in excessive support when a green signal is displayed in which the driving of the lane L1 is prioritized.

In the present embodiment, in the case of passing through a signalized intersection as shown in FIG. 15, the first controller 12 outputs a suppression instruction when the vehicle M1 enters the intervention suppression area and when the vehicle M1 travels preferentially (at the time of green signal) in the lane L1. In this case, it can be said that it is very unlikely that the vehicle will enter the intersection by ignoring the red signal from the lane L2. Therefore, according to the intervention suppression determination process of the present embodiment, it is possible to realize smooth traffic while ensuring substantial safety in consideration of the traffic environment.

Figure 16:
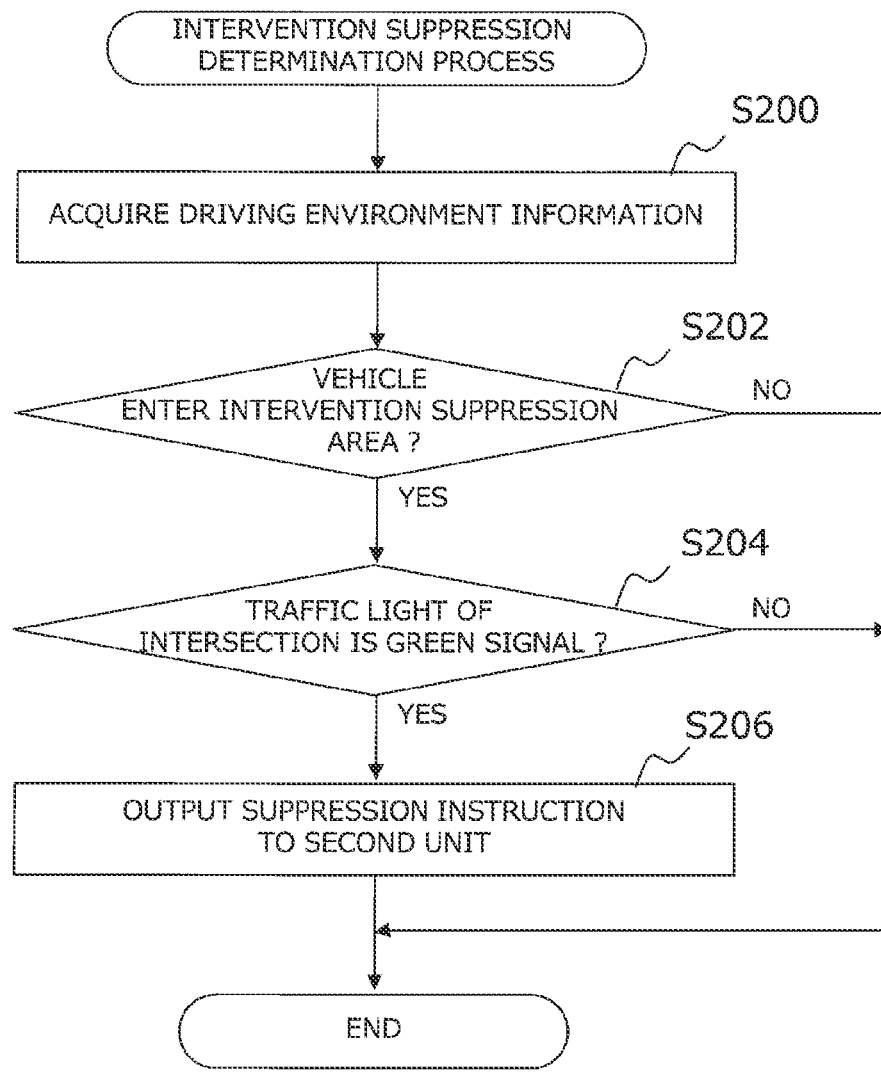
FIG. 16 is a flowchart showing a control routine of the intervention suppression determination process executed in the first controller according to the second embodiment.

2-3. Specifically Processing of Intervention Suppression Determination Process FIG. 16 is a flowchart showing a control routine of the intervention suppression determination process executed in the first controller according to the second embodiment. Incidentally, the control routine shown in FIG. 16 is repeatedly executed at a predetermined control cycle during automated driving of the vehicle M1.

In the control routine shown in FIG. 16, first in step S200, the first controller 12 acquires the driving environment information 130 from the first information acquisition device 14. The driving environment information 130 is stored in the first memory device 124.

Next in step S202, the first controller 12 determines whether the vehicle M1 enters the intervention suppression area based on the vehicle position information included in the driving environment information 130 and the intervention suppression area information stored in the first memory device 124. As a result, if the vehicle M1 does not enter the intervention suppression area, the routine is terminated.

On the other hand, if the vehicle M1 enters the intervention suppressing area, the first controller 12 determines whether the traffic light of the intersection is a green signal in step S204. Here, the first controller 12 determines the display state of the traffic light from the traffic environment information included in the driving environment information 130. As a result, if the signal is not a green signal indication or there is no traffic light, the routine is terminated. On the other hand, if the traffic light is a green signal indication, the first controller 12 outputs a suppression instruction to the second unit 20 via the first input/output interface 126, in step S206.

As described above, according to the vehicle control system of the present embodiment, by executing the intervention suppression determination process as described above, it is possible to perform the intervention suppression determination process in consideration of a change in the traffic environment.

What is claimed is:

1. A vehicle control system that controls a vehicle capable of performing automated driving, the vehicle control system comprising:
    a first controller configured to generate a target trajectory for the automated driving based on a travel plan of the vehicle; and
    a second controller configured to execute vehicle travel control that controls steering, acceleration, and deceleration of the vehicle such that the vehicle follows the target trajectory,
    wherein, during the automated driving, the second controller is configured to:
        control a travel control amount which is a control amount of the vehicle travel control;
        acquire driving environment information indicating a driving environment around the vehicle;
        determine an expected time-to-collision between the vehicle and an obstacle based on the driving environment information;
    wherein, the first controller includes a memory device in which information of an intervention suppression area indicating a geographical area for suppressing intervention of the travel control amount by a preventive safety control is stored, wherein, when the vehicle does not travel in the intervention suppression area during the automated driving, the second controller is configured to:
  determine whether the expected time-to-collision between the vehicle and the obstacle is less than a first predetermined threshold; and
  upon determination that the expected time-to-collision between the vehicle and the obstacle is less than the first predetermined threshold, determine a first preventative safety control for intervening in the travel control amount so as to prevent or avoid a collision between the vehicle and the obstacle, and execute the first preventative safety control, and
wherein, when the vehicle travels in the intervention suppression area during the automated driving, the second controller is configured to:
  determine whether the expected time-to-collision between the vehicle and the obstacle is less than a second predetermined threshold, the second predetermined threshold being less than the first predetermined threshold; and
  upon determination that the expected time-to-collision between the vehicle and the obstacle is less than the second predetermined threshold, determine a second preventative safety control for intervening in the travel control amount so as to prevent or avoid the collision between the vehicle and the obstacle, and execute the second preventative safety control,
wherein, when the target trajectory is a path entering the intervention suppression area, the first controller outputs a suppression instruction including a timing at which the vehicle enters the intervention suppression area.

2. The vehicle control system according to claim 1,
wherein, the vehicle includes a commercial vehicle that stops at a stop area,
wherein, the target trajectory includes a trajectory that stops at the stop area, and
wherein, the intervention suppression area includes a specific area around the stop area.

3. The vehicle control system according to claim 1,
wherein, the target trajectory includes a trajectory facing a blind area formed by a specific obstacle, and
wherein, the intervention suppression area includes a specific area around the blind area.

4. A vehicle control system that controls a vehicle capable of performing automated driving, the vehicle control system comprising:
  a first controller configured to generate a target trajectory for the automated driving based on a travel plan of the vehicle; and
  a second controller configured to execute vehicle travel control that controls steering, acceleration, and deceleration of the vehicle such that the vehicle follows the target trajectory,
wherein, during the automated driving, the second controller is configured to:
  control a travel control amount which is a control amount of the vehicle travel control;
  acquire driving environment information indicating a driving environment around the vehicle; and
  determine an expected time-to-collision between the vehicle and an obstacle based on the driving environment information;
wherein, the target trajectory includes passage of a signalized intersection upon which a traffic light is provided,
wherein, the first controller includes a memory device in which information of an intervention suppression area, which is a geographical area for suppressing intervention in the travel control amount by a preventive safety control, is stored,
wherein, in the case of not passing through the signalized intersection during the automated driving, the second controller is configured to:
  determine whether the expected time-to-collision between the vehicle and the obstacle is less than a first predetermined threshold; and
  upon determination that the expected time-to-collision between the vehicle and the obstacle is less than the first predetermined threshold, determine a first preventative safety control for intervening in the travel control amount so as to prevent or avoid a collision between the vehicle and the obstacle, and execute the first preventative safety control, and
wherein, in the case of passing through the signalized intersection during the automated driving, the first controller is configured to output a suppression instruction to the second controller when the vehicle travels through the intervention suppression area and the traffic light is an indication of priority travel, and wherein, upon receiving the suppression instruction, the second controller is configured to:
  determine whether the expected time-to-collision between the vehicle and the obstacle is less than a second predetermined threshold, the second predetermined threshold being less than the first predetermined threshold; and
  upon determination that the expected time-to-collision between the vehicle and the obstacle is less than the second predetermined threshold, determine a second preventative safety control for intervening in the travel control amount so as to prevent or avoid the collision between the vehicle and the obstacle, and execute the second preventative safety control,
wherein, when the target trajectory is a path entering the intervention suppression area, the first controller outputs a suppression instruction including a timing at which the vehicle enters the intervention suppression area.

* * * * *